US008250812B2

(12) United States Patent
Hebert et al.

(10) Patent No.: US 8,250,812 B2
(45) Date of Patent: Aug. 28, 2012

(54) SLIDER WINDOW ASSEMBLY

(75) Inventors: Bryan Emile Hebert, LaSalle (CA); Robert John Cicala, Rochester Hills, MI (US); Kenneth E. Keck, II, Clinton Township, MI (US)

(73) Assignee: Dura Global Technologies, LLC, Auburn Hills, MI (US)

( * ) Notice: Subject to any disclaimer, the term of this patent is extended or adjusted under 35 U.S.C. 154(b) by 576 days.

(21) Appl. No.: 11/329,501

(22) Filed: Jan. 10, 2006

(65) Prior Publication Data
US 2007/0157522 A1 Jul. 12, 2007

(51) Int. Cl.
*E05D 15/06* (2006.01)
(52) U.S. Cl. ............................................ 49/413; 49/380
(58) Field of Classification Search ............... 49/380, 49/413, 404, 125; 296/146.16, 201, 190.1
See application file for complete search history.

(56) References Cited

U.S. PATENT DOCUMENTS

| | | | | |
|---|---|---|---|---|
| 1,374,629 | A * | 4/1921 | Bailey | 49/441 |
| 5,505,023 | A * | 4/1996 | Gillen et al. | 49/380 |
| 5,522,191 | A * | 6/1996 | Wenner et al. | 52/204.51 |
| 5,809,706 | A | 9/1998 | Neaux | |
| 5,996,284 | A * | 12/1999 | Freimark et al. | 49/209 |
| 6,014,840 | A * | 1/2000 | Ray et al. | 49/413 |
| 6,902,224 | B2 * | 6/2005 | Weinert et al. | 296/146.16 |
| 6,920,719 | B2 * | 7/2005 | Bourque et al. | 49/413 |
| 6,955,009 | B2 * | 10/2005 | Rasmussen | 49/413 |
| 7,155,862 | B2 * | 1/2007 | Bourque et al. | 49/413 |
| 7,185,943 | B2 * | 3/2007 | Lesle et al. | 296/146.16 |
| 2004/0098917 | A1 | 5/2004 | Bourque | |
| 2004/0098918 | A1 * | 5/2004 | Bourque et al. | 49/413 |
| 2004/0098919 | A1 * | 5/2004 | Bourque et al. | 49/413 |
| 2004/0098920 | A1 | 5/2004 | Bourque | |
| 2004/0098933 | A1 | 5/2004 | Bourque | |
| 2004/0100121 | A1 | 5/2004 | Bourque | |
| 2005/0073172 | A1 * | 4/2005 | Weinert et al. | 296/146.16 |
| 2006/0080893 | A1 * | 4/2006 | Lesle et al. | 49/413 |
| 2006/0107600 | A1 * | 5/2006 | Nestell et al. | 49/413 |
| 2008/0122262 | A1 * | 5/2008 | Cicala | 296/201 |

* cited by examiner

*Primary Examiner* — Katherine w Mitchell
*Assistant Examiner* — Catherine A Kelly
(74) *Attorney, Agent, or Firm* — Porter, Wright, Morris & Arthur LLP; Richard M. Mescher; Dean B. Watson

(57) ABSTRACT

A slider window assembly for a motor vehicle includes a fixed panel formed of a single pane encircling an opening formed therein, a slider panel movable along a horizontal axis between closed and open positions, an injection-molded plastic slider frame adhesively bonded to the fixed panel, and at least one seal member forming a seal between the slider frame and the slider panel. The slider frame includes a sealing frame extending entirely about the opening, an upper run located above the opening and receiving the slider panel, and a lower run located below the opening and receiving the slider panel. There is preferably a substantially continuous adhesive bond between the slider frame and the fixed panel that entirely encircles the opening.

81 Claims, 11 Drawing Sheets

SLIDER WINDOW ASSEMBLY

CROSS-REFERENCE TO RELATED APPLICATIONS

Not Applicable.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to window assemblies for motor vehicles and, more particularly, to widow assemblies for motor vehicles having a window panel movable into a closed and sealed position over an opening in a static window panel.

BACKGROUND OF THE INVENTION

Many motor vehicles such as, for example, pickup trucks and vans have window assemblies with large fixed glass panels. To improve circulation within the vehicle, these fixed window panels are sometimes provided with sliding window panels or "sliders" that move between an open position to provide a window opening in the fixed window panel and a closed position to close the window opening. For example, passenger compartments of pickup trucks and other light trucks often have rearward facing window assemblies or "backlights" with sliding glass panels. Such windows are typically provided to the motor vehicle manufacturer, or in the aftermarket, as slider window assemblies having both fixed and sliding panels ready for installation into the motor vehicle as a unit.

Prior slider window assemblies are mechanically complex having large numbers of components. This large number of components requires a relatively large amount of assembly and results in a relatively large cost. Additionally, current slider window assemblies are relatively heavy. It is noted that it is a never ending desire of the motor vehicle industry to reduce cost an/or weight.

Prior slider window assemblies also do not seal well resulting in air and water leakage. Some window assemblies have frame members at the interface between the fixed window and the motor vehicle body that cause leakage while others have bulb seals at the sliding window that cause leakage because it is difficult to balance the high contact force required for a bulb seal and the difficulty to open the sliding window when there is high contact force. Additionally, rails for the sliding panels tend to collect water which can inhibit proper functioning of the window assembly. As a result, costly water management systems have been used which direct accumulated water from within the guide rails to locations outside the vehicles. Accordingly, there is a need in the art for an improved slider window assembly.

SUMMARY OF THE INVENTION

The present invention provides a slider window assembly which overcomes at least some of the above-noted problems of the related art. According to the present invention, a slider window assembly for a motor vehicle comprises, in combination, a fixed panel formed of a single pane encircling an opening formed therein, a slider panel movable along a horizontal axis between a closed position wherein the slider panel covers the opening and an open position wherein the slider panel does not entirely close the opening, a unitary injection-molded plastic slider frame adhesively bonded to the fixed panel, and at least one seal member forming a seal between the sealing frame and the slider panel. The slider panel has a top edge and a bottom edge. The slider frame includes a sealing frame extending entirely about the opening, an upper run located above the opening and receiving the top edge of the slider panel, and a lower run located below the opening and receiving the bottom edge of the slider panel. There is a substantially continuous adhesive bond between the slider frame and the fixed panel that entirely encircles the opening.

According to another aspect of the present invention, a slider window assembly for a motor vehicle comprises, in combination, a fixed panel comprised of glass and formed of a single pane encircling an opening formed therein, a slider panel comprised of glass and movable along a horizontal axis between a closed position wherein the slider panel covers the opening and an open position wherein the slider panel does not entirely close the opening, a latch secured to the slider panel, a unitary injection-molded plastic slider frame adhesively bonded to the fixed panel, and at least one seal member secured to the sealing frame and having a wiper flange sealingly engaging the slider panel when the slider panel is in the closed position. The slider panel has a top edge and a bottom edge. The slider frame includes a sealing frame extending entirely about the opening, an upper run located above the opening and receiving the top edge of the slider panel, and a lower run located below the opening and receiving the bottom edge of the slider panel. The slider frame also includes an integrally-molded latch keeper that cooperates with the latch to releasably secure the slider panel in the closed position, an integrally-molded rib vertically extending along one side of the opening and forming a stop for the slider panel in the closed position, an integrally-molded deflector extending about the opening and at least partially closing a gap formed between the slider panel and the fixed panel, a plurality of integrally-molded tabs extending to an edge of the fixed panel, and integrally-molded drain paths directing water by gravity from an interior of the lower run to locations outside the motor vehicle and wherein the drain paths are located at the tabs. An adhesive bead directly contacts the fixed panel and a window frame of the motor vehicle to sealingly secure the fixed frame to the motor vehicle and wherein the tabs extend between the bead and the fixed panel.

According to yet another aspect of the present invention, a method of making a slider window assembly for a motor vehicle comprises the steps of, in combination, providing a fixed panel formed of a single pane encircling an opening formed therein, providing a slider panel having a top edge and a bottom edge and that is movable along a horizontal axis between a closed position wherein the slider panel covers the opening and an open position wherein the slider panel does not entirely close the opening, injection molding a unitary plastic slider frame including a sealing frame extending entirely about the opening, an upper run located above the opening and receiving the top edge of the slider panel, and a lower run located below the opening and receiving the bottom edge of the slider panel, and providing at least one seal member forming a seal between the sealing frame and the slider panel. The slider frame is adhesively boded to the fixed panel with a substantially continuous adhesive bond between the slider frame and the fixed panel that entirely encircles the opening.

According to yet another aspect of the present invention, a slider window assembly for a motor vehicle comprises, in combination, a fixed panel formed of a single pane encircling an opening formed therein and a slider panel movable along a horizontal axis between a closed position wherein the slider panel covers the opening and an open position wherein the slider panel does not entirely close the opening. The slider panel has a top edge and a bottom edge. An injection-molded plastic sealing frame is adhesively bonded to the fixed panel. An injection-molded plastic upper run is located above the opening and receiving the top edge of the slider panel. An injection-molded plastic lower run is located below the opening and receiving the bottom edge of the slider panel. At least one of the upper run and the lower run is integrally molded with the sealing frame to form a single component. At least one seal member forms a seal between the sealing frame and the slider panel.

According to yet another aspect of the present invention, a slider window assembly for a motor vehicle comprises, in combination, a fixed panel formed of a single pane encircling an opening formed therein, and a slider panel movable along a horizontal axis between a closed position wherein the slider panel covers the opening and an open position wherein the slider panel does not entirely close the opening. The slider panel has a top edge and a bottom edge. An injection-molded plastic sealing frame is adhesively bonded to the fixed panel. A plastic upper run is located above the opening and receiving the top edge of the slider panel and a plastic lower run is located below the opening and receiving the bottom edge of the slider panel. The slider frame includes an integrally-molded deflector extending entirely about the opening and at least partially closing a gap formed between the slider panel and the fixed panel when the slider panel is in the closed position to provide a continuous look. At least one seal member forms a seal between the sealing frame and the slider panel.

From the foregoing disclosure and the following more detailed description of various preferred embodiments it will be apparent to those skilled in the art that the present invention provides a significant advance in the technology and art of slider window assemblies. Particularly significant in this regard is the potential the invention affords for providing a high quality, feature-rich, low cost slider window assembly. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
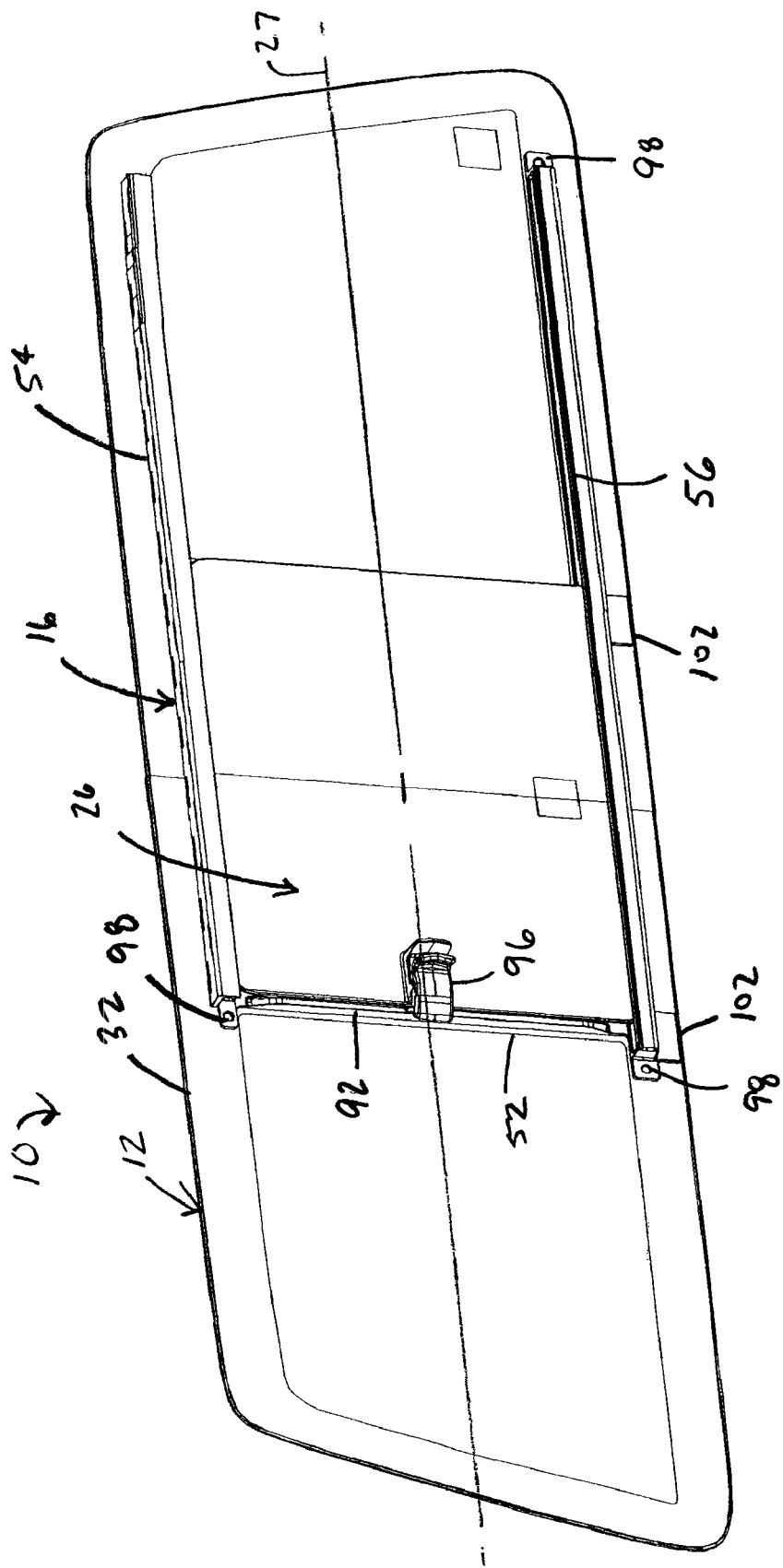
FIG. 1 is a front perspective view of a slider window assembly according to the present invention, wherein the sliding panel is in a fully closed position.
Figure 2:
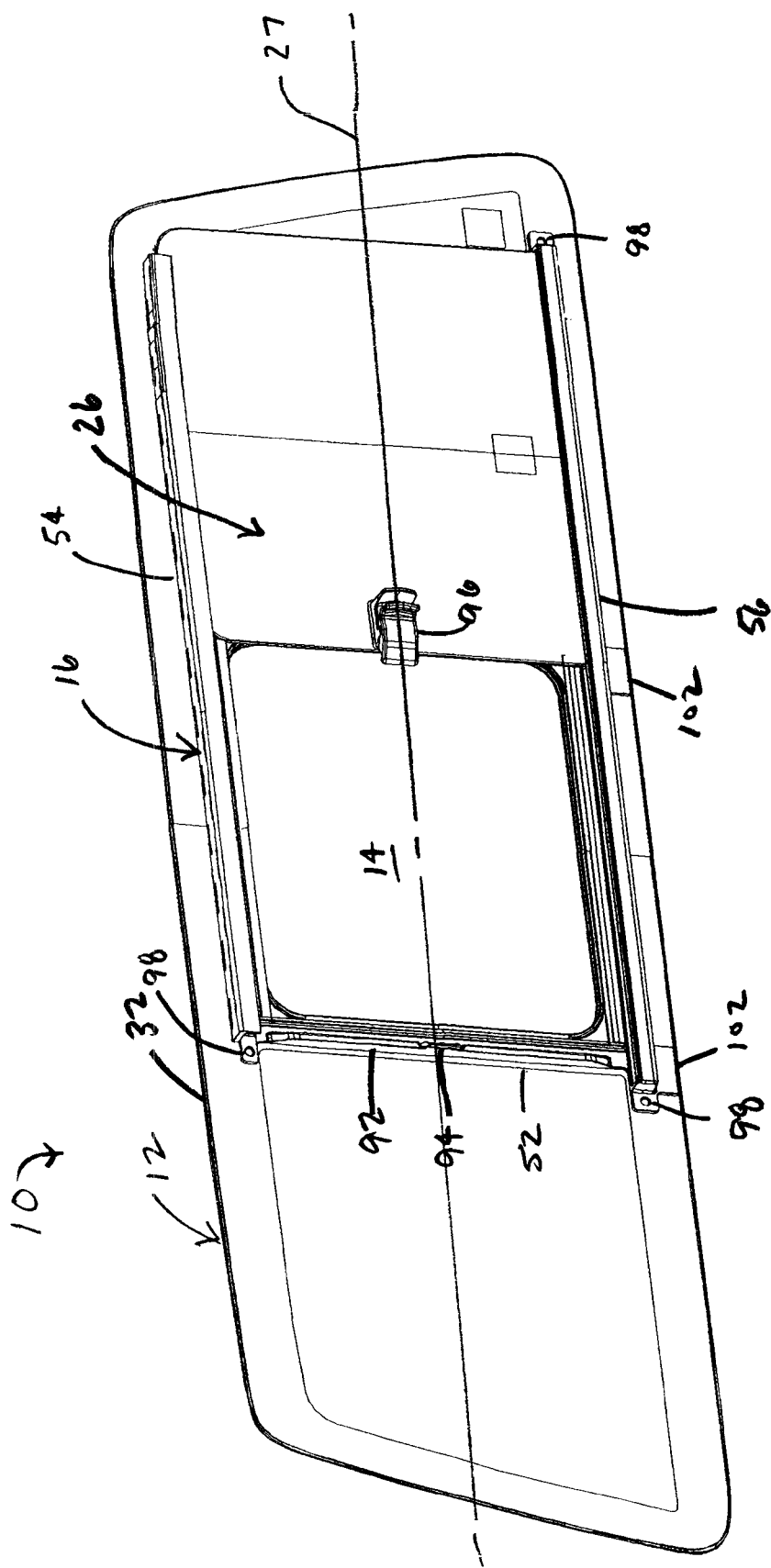
FIG. 2 is a front perspective view of the slider window assembly of FIG. 1 wherein the sliding panel is in a fully open position.

It should be understood that the appended drawings are not necessarily to scale, presenting a somewhat simplified representation of various preferred features illustrative of the basic principles of the invention. The specific design features of a slider window assembly as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the slider window assembly illustrated in the drawings. In general, up or upward refers to an upward direction within the plane of the paper in FIG. 4 and down or downward refers to a downward direction within the plane of the paper in FIG. 4. Also in general, fore or forward refers to a direction toward the front of the motor vehicle and out of the plane of the paper in FIG. 4 and aft, rear, or rearward refers to a direction toward the rear of the motor vehicle and into the plane of the paper in FIG. 4. Also right refers to a direction toward the right side of the motor vehicle and left refers to a direction toward the left side of the motor vehicle.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved slider window assemblies disclosed herein. The following detailed discussion of various alternative and preferred embodiments will illustrate the general principles of the invention with reference to a semi-flush slider window assembly for use as a backlight of a pickup or other light duty truck. Other embodiments suitable for other applications will be apparent to those skilled in the art given the benefit of this disclosure.

Referring now to the drawings, FIGS. 1 to 15 show a slider window assembly 10 for a motor vehicle according to the present invention. The illustrated slider window assembly 10 includes a static or fixed panel 12 having an opening 14 formed therein, a unitary slider frame 16 secured to the fixed panel 12 about the opening 14, at least one seal member 18, 20, 22, 24 secured to the slider frame 16 about the opening 14, and a slider panel 26 within the slider frame 16 and slideable along horizontal axis 27 between a fully closed position wherein the slider panel 26 covers the opening 14 and engages the at least one seal member 18, 20, 22, 24 to sealingly close the opening 14 and a fully open position wherein the center or slider panel 26 is moved away from the opening 14 so that the opening 14 is substantially and/or entirely open to provide access and/or ventilation for the passenger compartment of the motor vehicle through the opening 14 in the window assembly 10.

Figure 3:
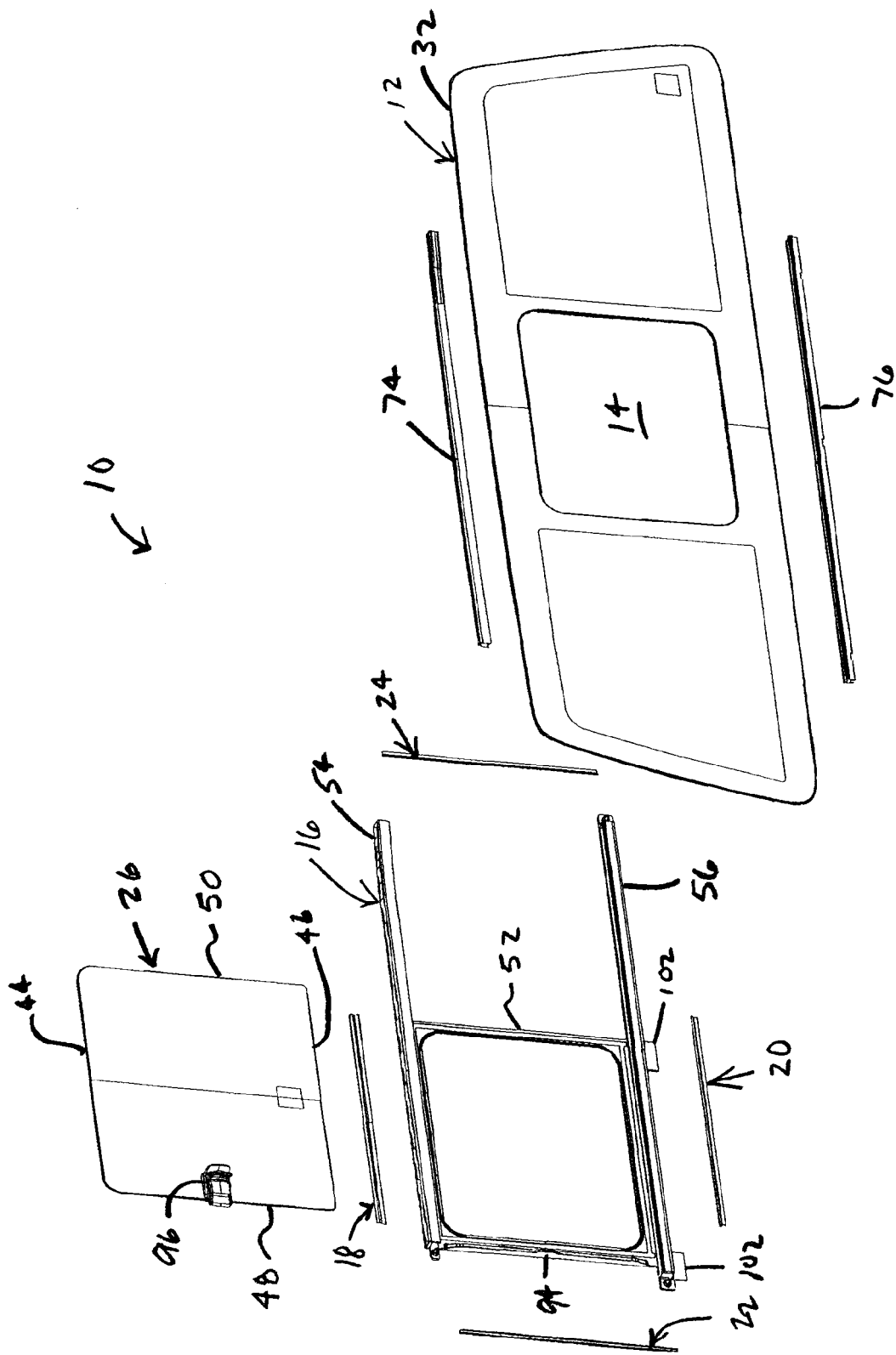
FIG. 3 is an exploded perspective view of the slider window assembly of FIGS. 1 and 2.

As best shown in FIG. 3, the illustrated fixed panel 12 is a single pane or sheet that entirely defines the opening 14 such that the pane entirely encircles the opening 14. The panel 12 includes a first or exterior surface 28 and an opposite second or interior surface 30 that is generally parallel to the first surface 28. Both of the surfaces 28, 30 terminate at a peripheral edge 32 that define the geometric shape of the fixed panel 12. The illustrated fixed panel 12 is generally trapezoidal shaped but it is noted that any other suitable shape can alternatively be utilized. The illustrated opening 14 is generally square-rectangular or shaped with rounded or radiused and is centrally located along the width of the fixed panel 12 but is noted that any other suitable shape and/or location can alternatively be utilized. The opening 14 can be cut or otherwise formed within the fixed panel 12. The fixed panel 12 may be curved, bent, or generally planar to conform to the desired need or application.

The fixed panel 12 is preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the fixed panel 12. Usually, the frit layer is utilized to form a continuous strip on the interior surface 30 near the peripheral edge 32 of the fixed panel 12. When viewed from the exterior of the motor vehicle, the frit layer provides an appearance of depth and richness which blends with surrounding painted or glass surfaces of the motor vehicle and/or hides and conceals components mounted to the fixed panel 12 within the motor vehicle.

As best shown in FIG. 3, the motor vehicle preferably includes one or more body panels 34 that define a window frame 36. The illustrated fixed panel 12 of the widow assembly 10 is secured to the frame 36 by a bead 38 of adhesive material such as, for example, a urethane adhesive or the like. The illustrated bead 38 is bonded to the interior surface 30 of the fixed panel 12 and an exterior facing surface of the window frame 36. The illustrated window frame 36 is recessed such that the exterior surface 28 of the fixed panel 12 is substantially flush with an exterior surface of the adjacent body panels 34. It is noted that the bead 38 affixes the fixed panel 12 to the body panels 34 and also forms a hermetic and water-tight seal between the fixed panel 12 and the body panels 34. It is noted that while the illustrated window assembly 10 is semi-flush with the body panels 34 (the fixed panel 12 is flush but the slider panel 26 is not flush), the window assembly 10 can be adapted to be entirely flush or not flush.

The illustrated slider panel 26 is a single pane or sheet that is sized to entirely cover the opening 14 when the slider panel 26 is in its closed position. The slider panel 26 includes a first or exterior surface 40 and an opposite second or interior surface 42 that is generally parallel to the first surface. Both of the surfaces 40, 42 terminate at peripheral edges that define the geometric shape of the slider panel 26. The illustrated slider panel 26 is generally square shaped with rounded or radiused corners including a top edge 44, a bottom edge 46, a first or right side edge 48, and a second left side edge 50. It is noted that the slider panel 26 can alternatively have any other suitable shape. The slider panel 26 may be curved, bent, or generally planar to conform to the desired need or application.

The slider panel 26 is preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the slider panel 26. Usually, the frit layer is utilized to form a continuous strip on the interior surface 42 near the peripheral edge 44, 46, 48, 50. When viewed from the exterior of the motor vehicle, the frit layer provides an appearance of depth and richness which blends with surrounding painted or glass surfaces of the motor vehicle and/or hides and conceals components mounted to the slider panel 26 within the motor vehicle.

The illustrated slider frame 16 includes a sealing frame 52 and spaced-apart, horizontally extending upper and lower guide runs or channels 54, 56. The slider frame 16 is preferably injection molded as a unitary, one-piece component. The slider frame 16 is preferably molded of a generally rigid plastic material such as, for example, glass filled Nylon or the like but any suitable plastic or plastics can be utilized. The overall geometric shape of the slider frame 16 is dictated by the shape of the opening 14 and the shape of the slider panel 26.

The illustrated sealing frame 52 of the slider frame 16 includes a substantially planar attachment wall 58 that is sized and shaped to closely encircle the opening 14 of the fixed panel 12. The attachment wall 58 is secured to the fixed panel 12 about the opening 14 as described in more detail hereinafter. As best shown in FIGS. 4, 5, 6, 8, 9, 10, and 11, an inner edge of the attachment wall 58 forms a cantilevered flange or deflector 60. The deflector 60 extends inwardly toward the slider panel 26 about the entire periphery of the opening 14 to partially cover and/or close the space or gap formed between the fixed panel 12 and the slider panel 26, when the slider panel 26 is in its closed position, to form a continuous look, that is, an appearance that there is not a gap or break between the fixed panel 12 and the slider panel 26 that is "continuous" and uninterrupted around the entire periphery of the opening 14 to keep the appearance constant. The illustrated deflector 60 is generally square-shaped with rounded or radiused corners to closely encircle the illustrated opening 14 but any other suitable shape can alternatively be utilized. The illustrated shape substantially hides the fact that the seal member 18, 20, 22, 24 is square or rectangular-shaped with square or substantially right-angle corners. The illustrated deflector 60 is, in cross-section, generally arcuate or curved in a concave manner facing the fixed panel 12. The deflector 60 serves the dual purposes of hiding the gap to provide the continuous look and shielding the seal member 18, 20, 22, 24 from high pressure water.

The illustrated seal member 18, 20, 22, 24 is located outwardly adjacent the deflector 60 and completely closes the space or gap formed between the fixed panel 12 and the slider panel 26, when the slider panel 26 is in its closed position, about the entire periphery of the opening 14. The illustrated at least one seal member 18, 20, 22, 24 includes an upper or first horizontal seal member 18, a second or lower horizontal seal member 20, a first or right vertical seal member 22, and a second or left vertical seal member 24. Each horizontal seal member 18, 20 is provided with a generally planar attachment wall 62 and a flange or wiper 64 extending inwardly from the attachment wall 62 and toward the free-end of the slider frame deflector 60 to sealingly engage the exterior surface 40 of the slider panel 26 (best shown in FIGS. 5, 6, and 11). The right vertical seal member 22 is provided with a generally planar attachment wall 62 and a pair of spaced-apart flanges or wipers 64 outwardly extending from the attachment wall 62 and away from the free-end of the slider frame deflector 60 to sealingly engage the exterior surface 40 of the slider panel 26 (best shown in FIG. 8A). The left vertical seal member 24 is provided with a generally planar attachment wall 62 and a flange or wiper 64 extending inwardly from the attachment wall 62 and toward the free-end of the slider frame deflector 60 to sealingly engage the exterior surface 40 of the slider panel 26 (best shown in FIG. 8B). The flanges 64 of the vertical seal members 22, 24 each extend in the same direction (toward the latching side of the slider frame 16 or toward right in the illustrated embodiment) so that the flanges 64 sealingly engage the slider panel 26 when the slider panel 26 is moved to the closed position. The illustrated seal members 18, 20, 22, 24 are each substantially straight to form a square or rectangularly-shaped seal with square or substantially right angle corners encircling the slider frame deflector 60 and the opening 14. The illustrated seal members 18, 20, 22, 24 are each secured to the inner or forward side of the slider frame attachment wall 58 with double sided adhesive tape 66. It is noted that the seal members 18, 20, 22, 24 can alternatively be secured in any other suitable manner. The illustrated seal members 18, 20, 22, 24 are extrusions formed of a polymeric material softer than the material of the slider frame 16. It is noted that other quantities of the seal members 18, 20, 22, 24 can alternatively be utilized such as, for example, a single integrated molded seal member, two or three seal members or more than four seal members and/or the seal members 18, 20, 22, 24 can alternatively have other suitable sizes and shapes such as, for example, a bulb seal. It is noted, however, that bending the seal ember around the corners can create puckering that leads to leaks.

Figure 8:
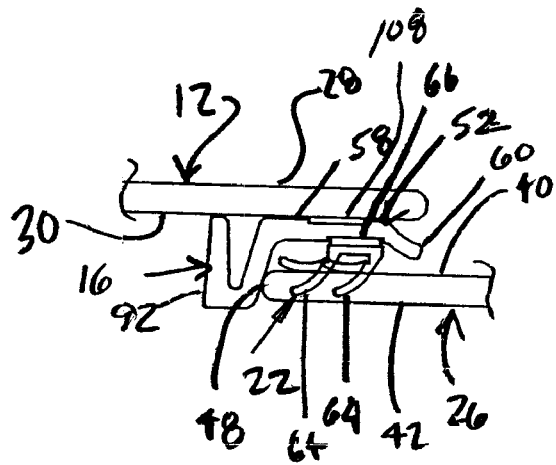
FIG. 8 is an enlarged cross-sectional view taken from line 8-8 of FIG. 4.
Figure 9:
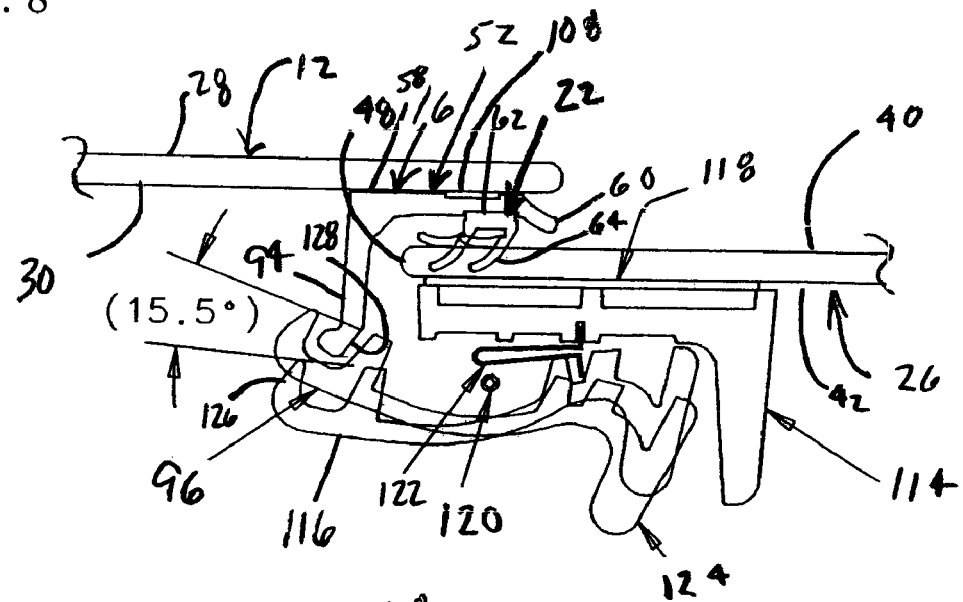
FIG. 9 is an enlarged cross-sectional view taken from line 9-9 of FIG. 4.
Figure 10:
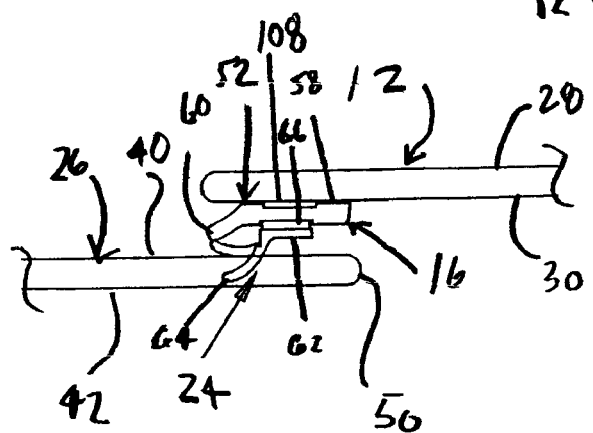
FIG. 10 is an enlarged cross-sectional view taken from line 10-10 of FIG. 4.

The slider frame deflector 60 and the seal members 18, 20, 22, 24 cooperate to form a two-part seal between the fixed panel 12 and the slider panel 26 about the entire periphery of the opening 14 when the slider panel 26 is in its closed position. The seal members 18, 20, 22, 24 form a first or "low pressure" seal that prevents low pressure water or other fluids from passing between the fixed panel 12 and the slider panel 26. The slider frame deflector 60 forms a second or "high-pressure" seal that substantially blocks high pressure streams of water or other fluids from reaching the "low pressure" seal that may otherwise break the low pressure seal. The deflector 60 essentially guards the seal members 18, 20, 22, 24 by substantially preventing high-pressure fluids from directly engaging the seal members 18, 20, 22, 24. As shown in FIGS. 8 and 9, the illustrated deflector 60 and the first vertical seal member 22 are angled relative to the slider panel 26 and the sealing frame 52 in different directions. The illustrated deflector 60 and the first vertical seal member 22 each form acute angles relative to the slider panel 26 so that they are angled in opposite directions. The deflector 60 angles from the sealing frame 52 toward the slider panel 26 in a direction toward the opening 14 and the first vertical seal member 22 angles from the sealing frame 52 toward the slider panel 26 in a direction away from the opening 14. The seal members 18, 20, 22, 24 engage the slider panel 26 to form a seal thereto when the slider panel 26 is in the closed position but the deflector 60 does not engage the slider panel 26 when the slider panel 26 is in the closed position. It is noted that the deflector 60 also provides the continuous look about the opening 14 by hiding the rectangular seal member 18, 20, 22, 24.

The illustrated upper and lower channels 54, 56 of the slider frame 16 extend from the right edge of the sealing frame 52 to a position near the left end of the fixed panel 12. Positioned in this manner, the channels 54, 56 extend leftward from the sealing frame 52 but it is noted that alternatively the channels 54, 56 can extend in the opposite direction or both directions. Each of the channels 54, 56 are U-shaped channels in cross-section having a horizontal main wall 68 and a pair of parallel, spaced-apart vertical side walls 70, 72 perpendicularly extending from the forward and rearward edges of the main wall 68. The upper channel 54 laterally extends along the top of the sealing frame 52 and the lower channel 56 laterally extends along the bottom of the sealing frame 52. The open sides of the channels 54, 56 face inwardly toward each other so that the top and bottom edges 44, 46 of the slider panel 26 can be received in the channels 54. 56 for lateral sliding motion between its closed and open positions as described in more detail hereinafter.

Figure 5:
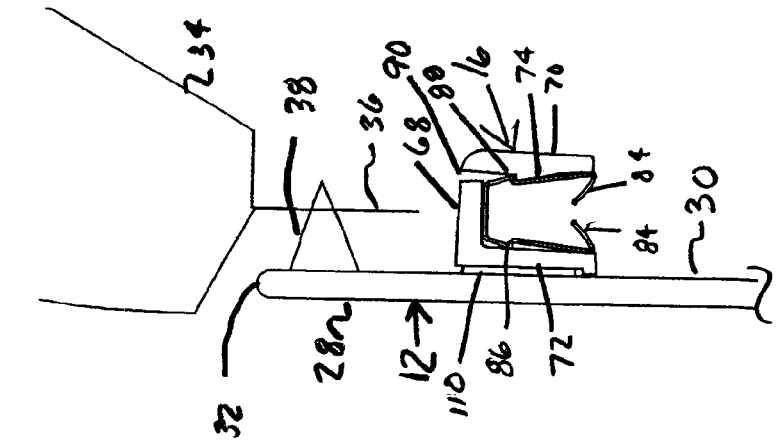
FIG. 5 is an enlarged cross-sectional view taken from line 5-5 of FIG. 4.
Figure 6:
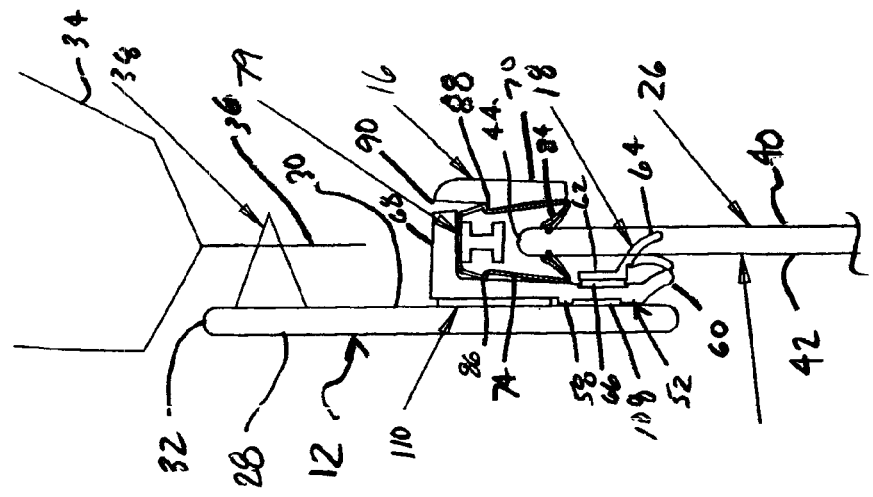
FIG. 6 is an enlarged cross-sectional view taken from line 6-6 of FIG. 4.
Figure 7:
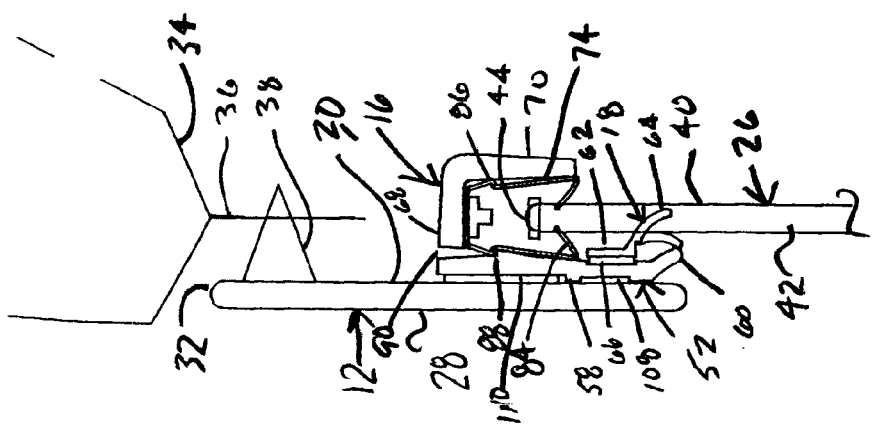
FIG. 7 is an enlarged cross-sectional view taken from line 7-7 of FIG. 4.
Figure 11:
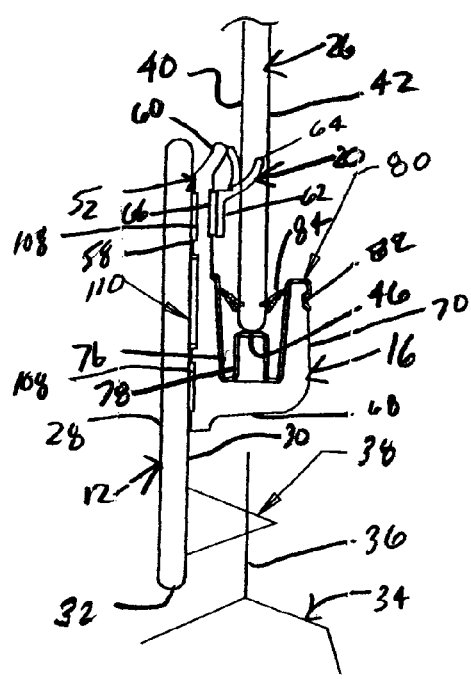
FIG. 11 is an enlarged cross-sectional view taken from line 11-11 of FIG. 4.
Figure 12:
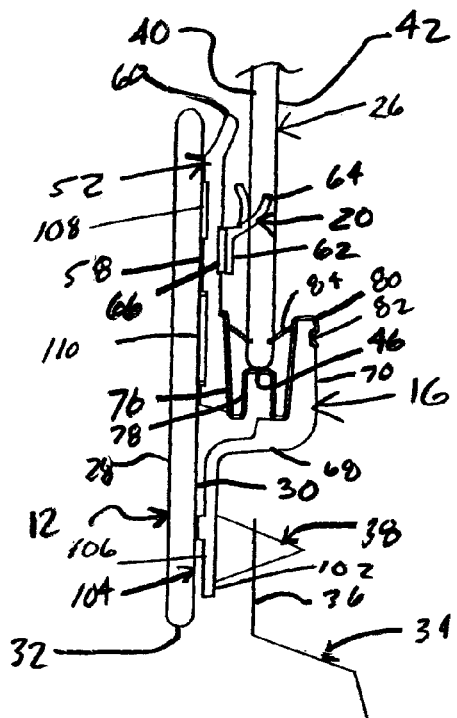
FIG. 12 is an enlarged cross-sectional view taken from line 12-12 of FIG. 4.
Figure 14:
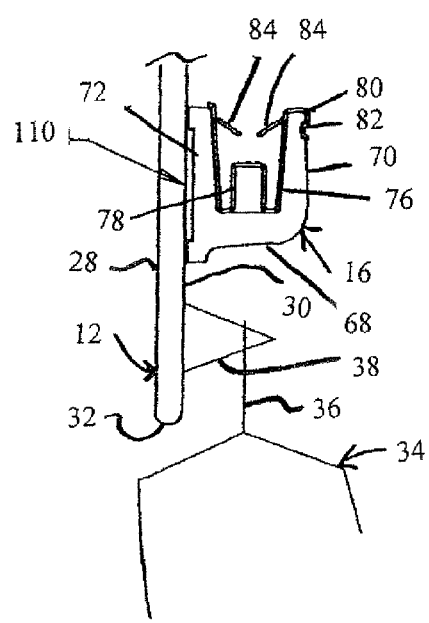
FIG. 14 is an enlarged cross-sectional view taken from line 14-14 of FIG. 4.

The illustrated channels 54, 56 have runs or inserts 74, 76 received therein. The inserts 74, 76 are preferably formed of an extruded polymeric material having a relatively low surface friction to facilitate sliding such as, for example, polypropylene. As best shown in FIGS. 11, 12 and 14 the lower insert 76 includes a support 78 upon which the bottom edge 46 of the slider panel 26 slideably rests. The lower insert 76 includes a flange 80 that wraps around the upper end of the forward side wall 70 with a formed tip received in a slot 82 formed on the forward side of the forward side wall 70 to secure the lower insert 76 to the lower channel 56. The lower insert 76 also includes a pair of flanges 84 that seal against the exterior and interior surfaces 40, 42 of the slider panel 26 respectively. As best shown in FIGS. 5 to 7, the upper insert 74 is substantially similar to the lower insert 76 except that there is a clearance provided between a center stop 79 and the top edge 44 of the slider panel 26 and the upper insert 74 is secured to the upper channel 54 in a different manner. The center stop 79 can be formed as a separate component and welded to the remainder of the upper insert 74. The center stop 79 is adapted to keep the slider panel 26 from wobbling during movement. The upper insert 74 is provided with a pair of downward-facing insert shoulders or abutments 86 that extend the length of the upper insert 74 and engage a plurality of upward-facing channel shoulders or abutments 88 formed at inner surfaces of the side walls 70, 72 of the upper channel 54 to secure the upper insert 74 to the upper channel 54. The illustrated channel abutments 88 alternate between the forward side of the rearward side wall 72 (best shown in FIG. 5) and the rearward side of the forward side wall 70 (best shown in FIGS. 6 and 7). The staggered configuration of the channel abutments 88 permit the upper insert 74 to be more easily inserted into the upper channel 54. The channel abutments 88 preferably each have a length of about one inch but any other suitable lengths can alternatively be utilized. Alternating openings 90 in the main wall 68 of the upper channel 54 correspond with the channel abutments 88 and enable the cannel abutments 88 to be integrally molded with the remainder of the slider frame 16.

As best shown in FIGS. 4, 8, 9, and 17, the illustrated injection-molded slider frame 16 is provided with an integrally-molded wall or rib 92 that forwardly extends from the sealing frame 52 along its right side for substantially the entire height of the opening 14. It is noted that while the illustrated rib 92 extends for substantially the entire vertical height of the opening 14, the rib 92 can alternatively extend only a portion of the vertical height of the opening 14. The rib 92 forms a positive stop or over travel-protection for the slider panel 26. That is, the slider panel 26 engages the rib 92 to stop further movement of the slider panel 26 when the slider panel 26 is moved to the fully closed position so that the slider panel 26 cannot be moved beyond the fully closed position. The rib 92 also forms anti-theft protection because the rib 92 eliminates a tool path from the exterior of the motor vehicle that could otherwise be used to pry open the slider panel 26. The illustrated injection-molded slider frame 16 is also provided with an integrally-molded latch keeper 94 centrally located along the height of the rib 92. The latch keeper 94 is sized and shaped to cooperate with a latch 96 secured to the slider panel 26 as described in more detail hereinafter.

Figure 4:
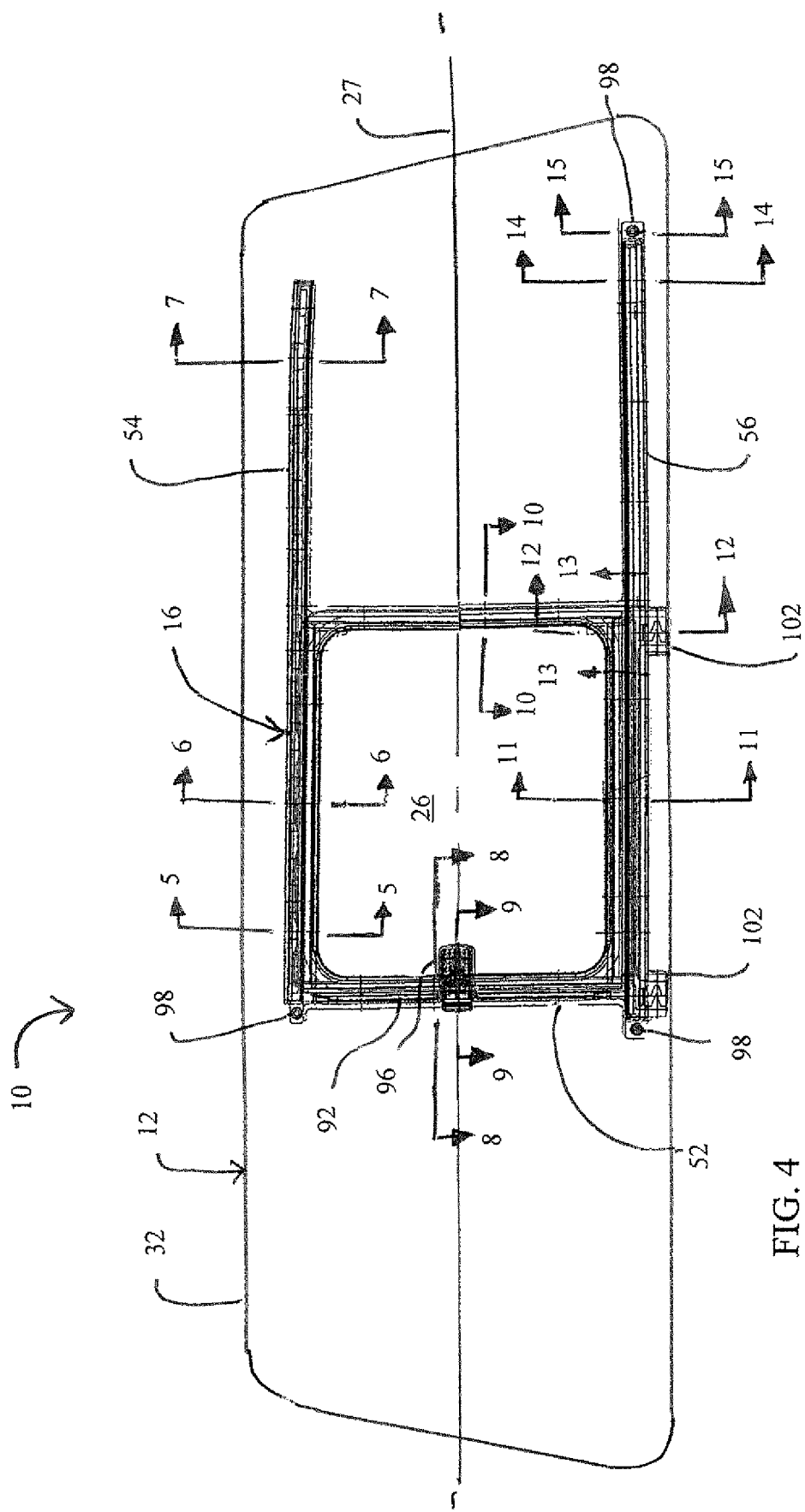
FIG. 4 is a front elevational view of the window assembly of FIGS. 1 to 3, wherein motor vehicle body components are removed for clarity.
Figure 15:
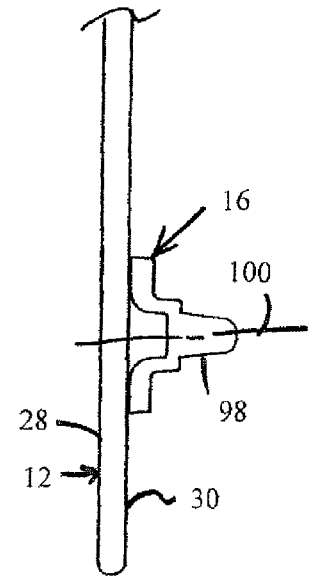
FIG. 15 is an enlarged cross-sectional view taken from line 15-15 of FIG. 4.
Figure 16:
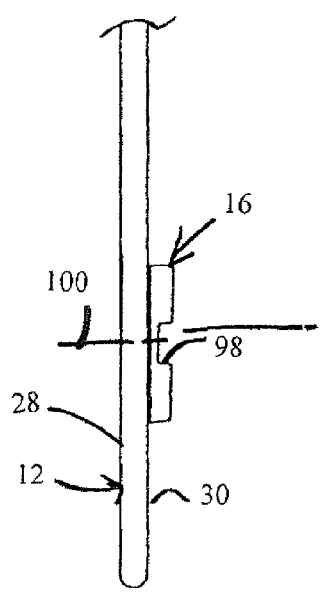
FIG. 16 is a cross sectional view similar to FIG. 15; but showing a variation of an alignment member.

As best shown in FIGS. 4 and 15, the illustrated injection-molded slider frame 16 is provided with a plurality of integrally-molded, spaced apart locating or alignment members 98 which enable the slider frame 16 to be secured to the fixed panel 12 in a desired location and orientation relative to a reference point or surface of the fixed panel 12. The illustrated slider frame 16 is provided with three alignment members 98 but other suitable quantities can be utilized. It is noted that at least three alignment members 98 are needed to locate the position and orientation of the slider frame 16 relative to the fixed panel 12. The illustrated alignment members 98 are located at the ends of the lower channel 56 and the right end of the upper channel 54 but any other suitable position can be utilized. The illustrated alignment members 98 are in the form of pins having a central axis 100 substantially perpendicular to the interior surface 30 of the fixed panel 12. It is noted, however, that the alignment members 98 can alternatively have any other suitable form such as, for example, the cylindrically shaped recesses or blind holes shown in FIG. 16. Once the slider frame 16 is secured to the fixed panel 12 as described in more detail hereinbelow and assembly is complete, the alignment members 98 can also be utilized to secure the slider window assembly 10 in a desired location and orientation relative to a reference point or surface of the motor vehicle.

As best shown in FIGS. 4 and 12, the illustrated injection-molded slider frame 16 is provided with a plurality of integrally-molded, spaced apart anchor or securing tabs 102 that extend between the fixed panel 12 and the bead 38 of adhesive securing the fixed panel 12 to the window frame 36 of the motor vehicle. Thus, the securing tabs 102 are directly adhered to the window frame 36 of the motor vehicle. In the event that the fixed panel 12 fails by cracking or breaking, the securing tabs 102 ensure that the slider frame 16 remains secured to the motor vehicle, that is, prevent separation of the slider frame 16 from the motor vehicle. The illustrated slider frame 16 is provided with two of the securing tabs 102 but any other suitable quantity of the securing tabs 102 can alternatively be utilized. The illustrated securing tabs 102 are provided at the bottom of the slider frame 16 near the lateral sides of the sealing frame 52 of the slider frame 16 but any other suitable location can alternatively be utilized.

Figure 13:
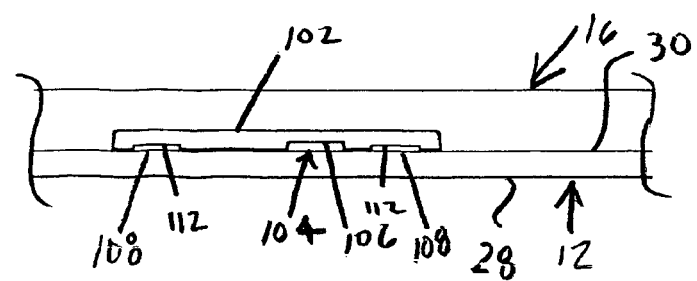
FIG. 13 is an enlarged cross-sectional view taken from line 13-13 of FIG. 4.

As best shown in FIGS. 4, 12 and 13, the illustrated injection-molded slider frame 16 is provided with a plurality integrally-molded drainage paths 104. The illustrated drain paths 104 extend from the interior of the lower channel 56 to the bottom of the securing tabs 102 so that any water or other liquids in the lower channel 56 drain by gravity through the drain paths 104 to the exterior of the vehicle. The illustrated drain paths 104 are partially formed by channels or grooves 106 in the rearward side of the securing tabs 102 and partially formed by the fixed panel 12 at the rearward side of the securing tabs 102. It is noted, however, that the drain paths 104 can alternatively be formed entirely within the slider frame 16. The illustrated grooves 106 form a tortuous or non-linear path having a chevron-shaped portion therein. It is noted that the drain paths 104 can alternatively have any other suitable shapes. The non-straight drain path 104 reduces wind noise such as whistling and the like.

Figure 18:
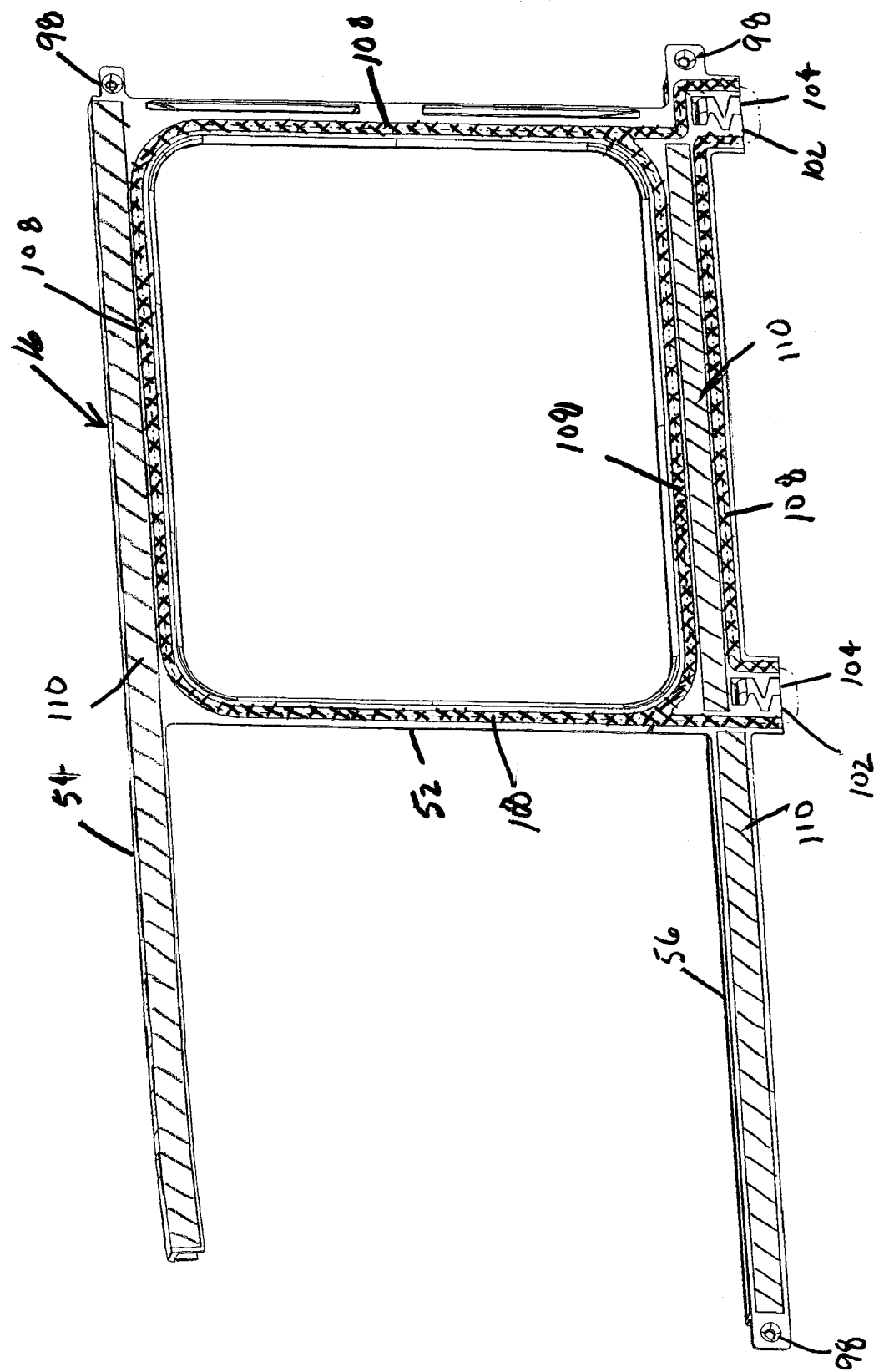
FIG. 18 is an enlarged, rear perspective view of the molded slider frame of the slider window assembly of FIGS. 1 to 4, showing locations of adhesive tape and adhesive beads.

As best shown in FIG. 18, the illustrated injection-molded slider frame 16 is attached to the fixed panel 12 by both adhesive 108 and double-sided adhesive tape 110. The adhesive 108 ensures a water-tight and hermetic seal between the slider frame 16 and the fixed panel 12 at desired locations and the double-sided tape 110 ensures that the slider frame 16 is secured to the fixed panel 12 while the adhesive 108 is curing. The illustrated adhesive 108 is provided entirely around the rear side of the slider frame sealing frame 52 in a continuous and uninterrupted manner to ensure that the slider frame 16 is adequately sealed to the fixed panel 12 about the opening 14 so that fluids passing through the opening 14 in the fixed panel 12 do not pass between the slider frame 26 and the fixed panel 12. While the illustrated embodiment utilizes a continuous and uninterrupted adhesive bond about the opening 14, it is noted that the adhesive bond can alternatively be substantially continuous with some interruptions that do not cause leaks. It is also noted that preferably at least the portion of the adhesive bond below the opening 14 is uninterrupted. The illustrated adhesive 108 is also provided at each side of the drain paths 104 to ensure that the slider frame 16 is adequately sealed to the fixed panel 12 about the drain paths 104 so that water passes from the lower channel 56 to the exterior of the motor vehicle only through the drain paths 104. The rearward side of the slider frame 16 is provided with grooves or channels 112 for holding the adhesive 108 in its desired locations. The illustrated double-side tape 110 is provided along the rear of the upper and lower channels 54, 56. It is noted that the double-sided tape 110 extending along the lower channel 56 is interrupted so that it does not interfere with the sealing adhesive 108. Thus, the adhesive 108 acts to secure and seal while the tape 110 acts to secure. The adhesive 108 can be a polyurethane adhesive or the like or any other suitable adhesive. The double-sided tape can be 3M PT1100 tape available from the 3M Company or the like or any other suitable double-sided tape. While the illustrated embodiment utilizes a combination of adhesive 108 and double-sided tape 110, it is noted that the slider frame 16 can alternatively be secured by an all adhesive attachment using a single-component adhesive, an all adhesive attachment using a two-component adhesive for rapid cure, or an all double-sided tape attachment.

During assembly, the adhesive 108 and the double-sided tape 110 are provided on the rear side of the slider frame 16 as shown. The fixed panel 12 is then placed against the interior side of the slider frame 16 using the alignment members 98 to ensure the proper position of the fixed panel 12 relative to the slider frame 16. The double-sided tape 110 adequately secures the slider frame 16 to the fixed panel 12 while the adhesive 108 is curing so that the assembler can remove the assembly from the fixture and move on to assemble the next slider window assembly 10 without waiting for the adhesive 108 to cure. The combination of adhesive 108 and tape 110 thus reduces assembly time and cost.

Figure 17:
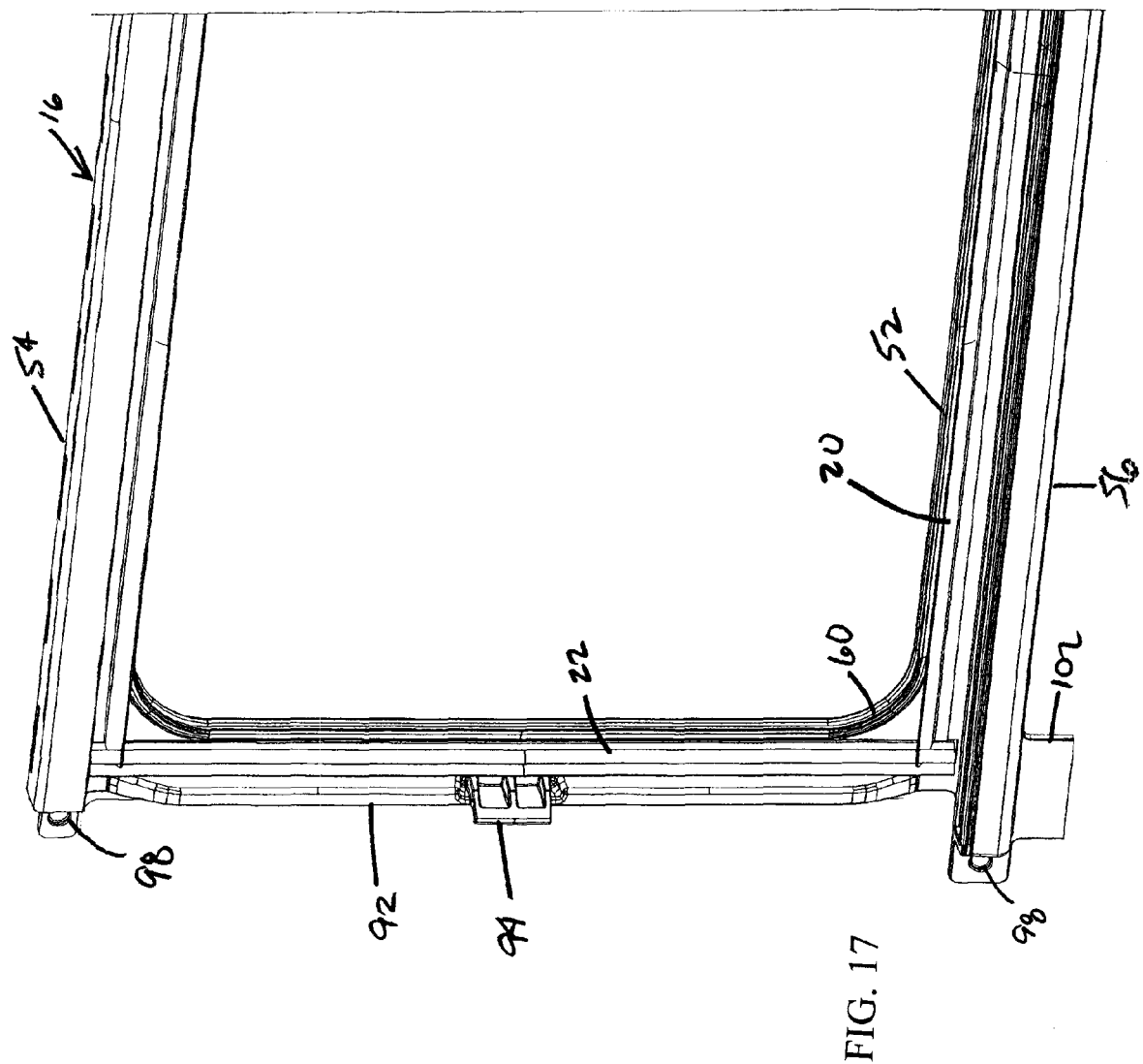
FIG. 17 is an enlarged and fragmented, front perspective view of a molded slider frame of the slider window assembly of FIGS. 1 to 4.

As best shown in FIGS. 4, 9, and 17, the slider panel 26 is provided with the releasable latch 96 to selectively secure the slider panel 26 in the fully closed position. The illustrated latch 96 has an attachment portion 114 and a latching portion 116 pivotably secured to the attachment portion 114. The attachment portion 114 is secured to the interior surface 42 of the slider panel 26 near the right side edge 48 the slider panel 26. The illustrated attachment portion 114 is secured to the slider panel by double-sided tape 118 but can alternatively be secured in any other suitable manner. The latching portion 116 is sized and shaped to cooperate with the latch keeper 94 of the slider frame 16 to secure the slider panel 26 to the slider frame 16 against movement when the latching portion 116 is in a locking position and engaging the latch keeper 94. The latching portion 116 is pivotably secured to the attachment portion 114 so that the latching portion 116 pivots about a vertical pivot axis 120 between its latching position and a releasing position wherein engagement with the latch keeper 94 is removed. A spring member 122 is provided to resiliently bias the latching portion 116 toward its latching position in engagement with the latch keeper 94. The latching portion 116 is provided with a handle 124 so that the latching portion 116 can be manually moved by the operator from the latching position to the releasing position when it is desired to open the slider panel 26. The illustrated latching portion 116 and the latch keeper 94 are provided with cooperating camming surfaces 126, 128 which automatically pivot the latching portion 116 when the slider panel 26 is moved to its fully closed position. It is noted that any other suitable latch 96 may alternatively be utilized.

Figure 20:
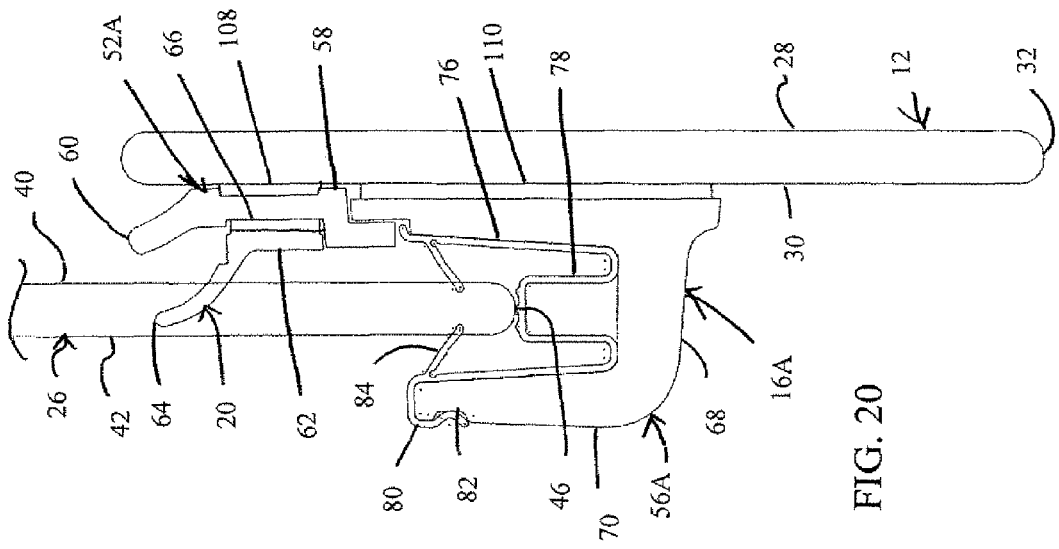
FIG. 20 is an enlarged cross-sectional view similar to FIG. 11 but showing a slider window assembly according to the second embodiment of the present invention.
Figure 19:
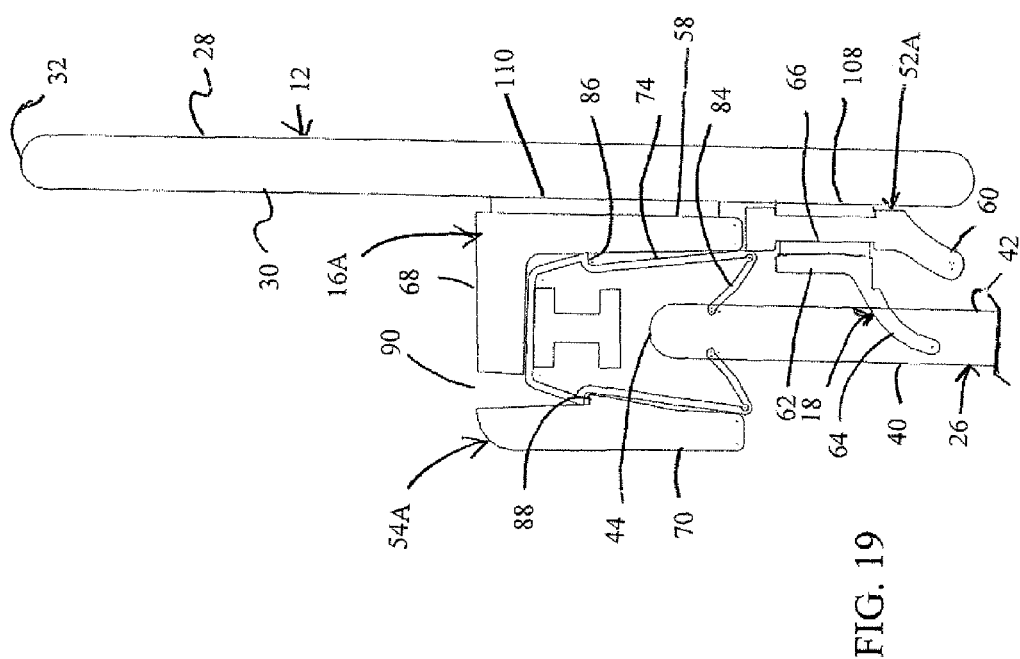
FIG. 19 is an enlarged cross-sectional view similar to FIG. 6 but showing a slider window assembly according to a second embodiment of the present invention.

FIGS. 19 and 20 show a slider window assembly 10A for a motor vehicle according to a second embodiment of the present invention and like reference numbers are used to indicate like structure with the first embodiment of the present invention. The slider window assembly 10A is substantially the same as the slider window assembly 10 according to the first embodiment described in detail hereinabove except that the slider frame 16A has two or three separate components rather than an integrated one-piece injection-molded component as in the first embodiment. FIGS. 19 and 20 illustrate that either or both of the upper and lower channels 54A, 56A can be a separate injection-molded component from the sealing frame 52A. Thus, the slider frame 16A can be of two-piece construction having a first component including the sealing frame 52A and one of the upper and lower channels 54A, 56A integrally injection-molded together and a separate second component including the other one of the upper and lower channels 54A, 56A or three-piece construction having first component including the sealing frame 52A, a separate second component including the upper channel, and a separate third component including the lower channel 56A. As best shown in FIG. 20, the illustrated slider frame 52A has a lower flange that overlaps an upper edge of the lower channel 56A.

It is noted that the tooling costs for molding the slider frame 16A are reduced when multiple-piece construction is utilized.

From the foregoing disclosure it will be apparent that the present invention provides a slider window assembly 10 that is mechanically simple having a relatively small numbers of components. This relatively small number of components requires a relatively low amount of assembly and results in a relatively low cost. Additionally, the slider window assembly 10 is relatively light weight and provides improved sealing and water drainage.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A slider window assembly for a motor vehicle comprising, in combination:
   a fixed panel formed of a single pane encircling an opening formed therein;
   a slider panel movable along a horizontal axis between a closed position wherein the slider panel covers the opening and an open position wherein the slider panel does not entirely close the opening;
   wherein said slider panel has a top edge and a bottom edge;
   a unitary injection-molded plastic slider frame adhesively bonded to the fixed panel;
   wherein the slider frame includes a sealing frame extending entirely about the opening, an upper run located above the opening and receiving the top edge of the slider panel, and a lower run located below the opening and receiving the bottom edge of the slider panel;
   wherein there is a substantially continuous adhesive bond between the slider frame and the fixed panel that entirely encircles the opening to form a seal entirely about the opening between the slider frame and the fixed panel;
   right and left vertical seal members secured to the slider frame on opposite sides of the opening and forming a seal between the sealing frame and the slider panel;
   a deflector secured to the slider frame and wherein the deflector and the right vertical seal member are angled relative to the slider panel with acute angles in different directions; and
   wherein the slider frame is formed of a rigid plastic and the right and left seal members are formed of a polymeric material softer than the plastic of the slider frame.

2. The slider window assembly according to claim 1, wherein the fixed panel is a glass window and the slider panel is a glass window.

3. The slider window assembly according to claim 1, wherein an adhesive bead directly contacts the fixed panel and a window frame of the motor vehicle to sealingly secure the fixed frame to the motor vehicle.

4. The slider window assembly according to claim 1, further comprising a latch secured to the slider panel and wherein the slider frame includes an integrally-molded latch keeper that cooperates with the latch to releasably secure the slider panel in the closed position.

5. The slider window assembly according to claim 1, wherein the lower run includes an integrally-molded drain path directing water by gravity from an interior of the lower run to a location outside the motor vehicle.

6. The slider window assembly according to claim 5, wherein the drain path is a non-linear path.

7. The slider window assembly according to claim 6, wherein the drain path includes a chevron-shaped portion.

8. The slider window assembly according to claim 1, wherein the slider frame includes an integrally-molded rib vertically extending along one side of the opening and forming a stop for the slider panel in the closed position.

9. The slider window assembly according to claim 8, wherein the rib vertically extends along an entire height of the opening.

10. The slider window assembly according to claim 8, further comprising a latch secured to the slider panel and wherein the slider frame includes an integrally-molded latch keeper along the rib that cooperates with the latch to releasably secure the slider panel in the closed position.

11. The slider window assembly according to claim 1, wherein the deflector extends entirely about the opening and at least partially closes a gap formed between the slider panel and the fixed panel when the slider panel is in the closed position.

12. The slider window assembly according to claim 1, wherein the right and left vertical seal members are located outward of the deflector relative to the opening so that the deflector at least partially shields the right and left vertical seal members from high pressure water spray located outside the motor vehicle when the slider panel is in the closed position.

13. The slider window assembly according to claim 1, further comprising an upper insert located within and extending along the upper run, wherein the upper run comprises a U-shaped channel having spaced-apart first and second side walls receiving the insert therebetween, and wherein the upper run includes a plurality of upward facing abutments integrally-molded at interior sides of the first and second side walls and engaging the upper insert to secure the upper insert to the upper run.

14. The slider window assembly according to claim 13, wherein the abutments alternate between the first and second side walls along a length of the upper run.

15. The slider window assembly according to claim 1, wherein the slider frame includes a plurality of integrally-molded locating members for positioning the slider frame relative to the fixed panel during assembly.

16. The slider window assembly according to claim 15, wherein the locating members position the window assembly relative to the motor vehicle.

17. The slider window assembly according to claim 15, wherein the locating features are one of pins and blind openings.

18. The slider window assembly according to claim 15, wherein the locating features are located near ends of the upper and lower runs.

19. The slider window assembly according to claim 1, wherein the slider frame includes a plurality of integrally-molded tabs extending to an edge of the fixed panel.

20. The slider window assembly according to claim 19, wherein an adhesive bead directly contacts the fixed panel and a window frame of the motor vehicle to sealingly secure the fixed frame to the motor vehicle except at the tabs wherein the tabs extend between the bead and the fixed panel.

21. The slider window assembly according to claim 19, wherein the slider frame includes integrally-molded drain paths directing water by gravity from an interior of the lower run to locations outside the motor vehicle and wherein the drain paths are located at the tabs.

22. The slider window assembly according to claim 1, wherein the slider frame is secured to the fixed panel with adhesive and double-sided adhesive tape.

23. The slider window assembly according to claim 22, wherein the adhesive entirely encircles the opening and the double-sided adhesive tape extends along the length of the upper run and the lower run.

24. The slider window assembly according to claim 1, wherein the right and left vertical seal members are secured to the sealing frame and include a wiper flange sealingly engaging the slider panel when the slider panel is in the closed position.

25. The slider window assembly according to claim 1, further comprising an upper horizontal seal member located above the opening, and a lower horizontal seal member located below the opening, so that the right and left vertical seal members and the upper and lower seal members cooperate to form a rectangular shape about the opening.

26. The slider window assembly according to claim 25, wherein the seal members are each secured to the sealing frame and each include a wiper flange sealingly engaging the slider panel when the slider panel is in the closed position.

27. The slider window assembly according to claim 1, wherein at least one of the fixed panel and the slider panel is a plastic panel.

28. A slider window assembly for a motor vehicle comprising, in combination:
  a fixed panel comprised of glass and formed of a single pane encircling an opening formed therein;
  a slider panel comprised of glass and movable along a horizontal axis between a closed position wherein the slider panel covers the opening and an open position wherein the slider panel does not entirely close the opening;
  wherein said slider panel has a top edge and a bottom edge;
  a latch secured to the slider panel;
  a unitary injection-molded plastic slider frame adhesively bonded to the fixed panel;
  wherein the slider frame includes a sealing frame extending entirely about the opening and forming a seal entirely about the opening between the slider frame and the fixed panel, an upper run located above the opening and receiving the top edge of the slider panel, and a lower run located below the opening and receiving the bottom edge of the slider panel;
  wherein the slider frame includes an integrally-molded latch keeper that cooperates with the latch to releasably secure the slider panel in the closed position;
  wherein the slider frame includes an integrally-molded rib vertically extending along one side of the opening and forming a stop for the slider panel in the closed position;
  right and left vertical seal members secured to the sealing frame on opposite sides of the opening and having a wiper flange sealingly engaging the slider panel when the slider panel is in the closed position;
  a deflector integral with the seal member
  a deflector secured to the slider frame and angled relative to the slider panel with an acute angle in a different direction than the right vertical seal member, and wherein the deflector at least partially closes a gap formed between the slider panel and the fixed panel when the slider panel is in the closed position;
  wherein the slider frame includes a plurality of integrally-molded tabs extending to an edge of the fixed panel;

wherein the slider frame includes integrally-molded drain paths directing water by gravity from an interior of the lower run to locations outside the motor vehicle and wherein the drain paths are located at the tabs;

wherein an adhesive bead directly contacts the fixed panel and a window frame of the motor vehicle to sealingly secure the fixed frame to the motor vehicle and wherein the tabs extend between the bead and the fixed panel; and wherein the slider frame is formed of a rigid plastic and the right and left seal members are formed of a polymeric material softer than the plastic of the slider frame.

29. A slider window assembly for a motor vehicle comprising, in combination:

a fixed panel formed of a single pane encircling an opening formed therein;

a slider panel movable along a horizontal axis between a closed position wherein the slider panel covers the opening and an open position wherein the slider panel does not entirely close the opening;

wherein said slider panel has a top edge and a bottom edge;

an injection-molded plastic sealing frame adhesively bonded to the fixed panel and extending entirely about the opening to form a seal entirely about the opening between the sealing frame and the fixed panel;

a plastic upper run located above the opening and receiving the top edge of the slider panel, a plastic lower run located below the opening and receiving the bottom edge of the slider panel;

wherein at least one of the upper run and the lower run is integrally molded with the sealing frame to form a single component;

right and left vertical seal members secured to the sealing frame on opposite sides of the opening and forming a seal between the sealing frame and the slider panel;

a deflector secured to the slider frame and wherein the deflector and the right vertical seal member are angled relative to the slider panel with acute angles in different directions; and wherein the sealing frame is formed of a rigid plastic and the right and left seal members are formed of a polymeric material softer than the plastic of the slider frame.

30. The slider window assembly according to claim 29, wherein both the upper run and the lower run are integrally molded with the sealing frame to form a single component.

31. A slider window assembly for a motor vehicle comprising, in combination:

a fixed panel formed of a single pane encircling an opening formed therein;

a slider panel movable along a horizontal axis between a closed position wherein the slider panel covers the opening and an open position wherein the slider panel does not entirely close the opening;

wherein said slider panel has a top edge and a bottom edge;

an injection-molded plastic sealing frame adhesively bonded to the fixed panel and extending entirely about the opening to form a seal entirely about the opening between the sealing frame and the fixed panel;

a plastic upper run located above the opening and receiving the top edge of the slider panel, a plastic lower run located below the opening and receiving the bottom edge of the slider panel;

right and left vertical seal members secured to the sealing frame on opposite sides of the opening and forming a seal between the sealing frame and the slider panel;

a deflector secured to the slider frame and angled relative to the slider panel with an acute angle in a different direction than the right vertical seal member and wherein the deflector at least partially closes a gap formed between the slider panel and the fixed panel when the slider panel is in the closed position; and wherein the sealing frame is formed of a rigid plastic and right and left seal members are formed of a polymeric material softer than the plastic of the slider frame.

32. The slider window assembly according to claim 31, further comprising an upper horizontal seal member located above the opening, and a lower horizontal seal member located below the opening, so that the right and left vertical seal members and the upper and lower seal members cooperate to form a a rectangular shape about the opening.

33. The slider window assembly according to claim 32, wherein the seal members are each secured to the sealing frame and each include a wiper flange sealingly engaging the slider panel when the slider panel is in the closed position.

34. The slider window assembly according to claim 1, wherein the deflector and the right vertical seal member each form acute angles relative to the slider panel so that they are angled in opposite directions.

35. The slider window assembly according to claim 1, wherein the deflector angles from the slider frame toward the slider panel in a direction toward the opening and the right vertical seal member angles from the slider frame toward the slider panel in a direction away from the opening.

36. The slider window assembly according to claim 1, wherein the deflector angles from the slider frame toward the slider panel in an opening direction of the slider panel and the right vertical seal member angles from the slider frame toward the slider panel in a closing direction of the slider panel.

37. The slider window assembly according to claim 1, wherein the right and left vertical seals include a wiper flange and wherein the deflector includes a cantilevered flange.

38. The slider window assembly according to claim 37, wherein the wiper flange sealingly engaging the slider panel when the slider panel is in the closed position and wherein the cantilevered flange does not engage the slider panel when the slider panel is in the closed position.

39. The slider window assembly according to claim 28, wherein the deflector and the right vertical seal member each form acute angles relative to the slider panel so that they are angled in opposite directions.

40. The slider window assembly according to claim 28, wherein the deflector angles from the slider frame toward the slider panel in a direction toward the opening and the right vertical seal member angles from the slider frame toward the slider panel in a direction away from the opening.

41. The slider window assembly according to claim 28, wherein the deflector angles from the slider frame toward the slider panel in an opening direction of the slider panel and the right vertical seal member angles from the slider frame toward the slider panel in a closing direction of the slider panel.

42. The slider window assembly according to claim 28, wherein the right and left vertical seal members include a wiper flange and wherein the deflector includes a cantilevered flange.

43. The slider window assembly according to claim 42, wherein the wiper flange sealingly engaging the slider panel when the slider panel is in the closed position and wherein the cantilevered flange does not engage the slider panel when the slider panel is in the closed position.

44. The slider window assembly according to claim 28, wherein the deflector extends entirely about the opening and at least partially closes a gap formed between the slider panel and the fixed panel when the slider panel is in the closed position.

45. The slider window assembly according to claim 28, wherein the right and left vertical seal members are located outward of the deflector relative to the opening so that the deflector at least partially shields the right and left vertical seal members from high pressure water spray located outside the motor vehicle when the slider panel is in the closed position.

46. The slider window assembly according to claim 29, wherein the deflector and the right vertical seal member each form acute angles relative to the slider panel so that they are angled in opposite directions.

47. The slider window assembly according to claim 29, wherein the deflector angles from the sealing frame toward the slider panel in a direction toward the opening and the right vertical seal member angles from the sealing frame toward the slider panel in a direction away from the opening.

48. The slider window assembly according to claim 29, wherein the deflector angles from the sealing frame toward the slider panel in an opening direction of the sealing panel and the right vertical seal member angles from the sealing frame toward the slider panel in a closing direction of the slider panel.

49. The slider window assembly according to claim 29, wherein the right vertical seal member includes a wiper flange and wherein the deflector includes a cantilevered flange.

50. The slider window assembly according to claim 49, wherein the wiper flange sealingly engaging the slider panel when the slider panel is in the closed position and wherein the cantilevered flange does not engage the slider panel when the slider panel is in the closed position.

51. The slider window assembly according to claim 29, wherein the deflector extends entirely about the opening and at least partially closes a gap formed between the slider panel and the fixed panel when the slider panel is in the closed position.

52. The slider window assembly according to claim 29, wherein the right and left seal members are located outward of the deflector relative to the opening so that the deflector at least partially shields the right and left seal members from high pressure water spray located outside the motor vehicle when the slider panel is in the closed position.

53. The slider window assembly according to claim 31, wherein the deflector and the seal member each form acute angles relative to the slider panel so that they are angled in opposite directions.

54. The slider window assembly according to claim 31, wherein the deflector angles from the sealing frame toward the slider panel in a direction toward the opening and the right vertical seal member angles from the sealing frame toward the slider panel in a direction away from the opening.

55. The slider window assembly according to claim 31, wherein the deflector angles from the sealing frame toward the slider panel in an opening direction of the sealing panel and the right vertical seal member angles from the sealing frame toward the slider panel in a closing direction of the slider panel.

56. The slider window assembly according to claim 31, wherein the right and left vertical seal members include a wiper flange and wherein the deflector includes a cantilevered flange.

57. The slider window assembly according to claim 56, wherein the wiper flange sealingly engaging the slider panel when the slider panel is in the closed position and wherein the cantilevered flange does not engage the slider panel when the slider panel is in the closed position.

58. The slider window assembly according to claim 31, wherein the deflector extends entirely about the opening and at least partially closes a gap formed between the slider panel and the fixed panel when the slider panel is in the closed position.

59. The slider window assembly according to claim 31, wherein the right and left vertical seal members are located outward of the deflector relative to the opening so that the deflector at least partially shields the right and left vertical seal members from high pressure water spray located outside the motor vehicle when the slider panel is in the closed position.

60. A slider window assembly for a motor vehicle comprising, in combination:
at least one fixed panel forming an opening;
a slider panel movable along a horizontal axis between a closed position wherein the slider panel covers the opening and an open position wherein the slider panel does not entirely close the opening;
wherein said slider panel has a top edge and a bottom edge;
a slider frame including a sealing frame extending about the opening, an upper run located above the opening and receiving the top edge of the slider panel, and a lower run located below the opening and receiving the bottom edge of the slider panel;
a vertically extending right vertical seal member secured to the slider frame at a right side of the opening and forming a seal between the sealing frame and the slider panel when the slider panel is in the closed position;
a deflector secured to the slider frame; and
wherein the deflector and the right vertical seal member are angled relative to the slider panel with acute angles in different directions.

61. The slider window assembly according to claim 60, wherein the deflector and the right vertical seal member form acute angles relative to the slider panel so that they are angled in opposite directions.

62. The slider window assembly according to claim 60, wherein the deflector angles from the sealing frame toward the slider panel in a direction toward the opening and the right vertical seal member angles from the sealing frame toward the slider panel in a direction away from the opening.

63. The slider window assembly according to claim 60, wherein the deflector angles from the sealing frame toward the slider panel in an opening direction of the slider panel and the right vertical seal member angles from the sealing frame toward the slider panel in a closing direction of the slider panel.

64. The slider window assembly according to claim 60, wherein the right vertical seal member includes a wiper flange and wherein the deflector includes a cantilevered flange.

65. The slider window assembly according to claim 64, wherein the wiper flange sealingly engaging the slider panel when the slider panel is in the closed position and wherein the cantilevered flange does not engage the slider panel when the slider panel is in the closed position.

66. The slider window assembly according to claim 60, wherein the right vertical seal member is located outward of the deflector relative to the opening so that the deflector at least partially shields the sealing member from high pressure water spray located outside the motor vehicle when the slider panel is in the closed position.

67. The slider window assembly according to claim 60, wherein an adhesive bead directly contacts the fixed panel and a window frame of the motor vehicle to sealingly secure the fixed frame to the motor vehicle.

68. The slider window assembly according to claim 60, further comprising a latch secured to the slider panel and wherein the slider frame includes an integrally-molded latch keeper that cooperates with the latch to releasably secure the slider panel in the closed position.

69. The slider window assembly according to claim 60, wherein the lower run includes an integrally-molded drain path directing water by gravity from an interior of the lower run to a location outside the motor vehicle.

70. The slider window assembly according to claim 69, wherein the drain path is a non-linear path.

71. The slider window assembly according to claim 70, wherein the drain path includes a chevron-shaped portion.

72. The slider window assembly according to claim 60, wherein the slider frame includes an integrally-molded rib vertically extending along one side of the opening and forming a stop for the slider panel in the closed position.

73. The slider window assembly according to claim 72, wherein the rib vertically extends along an entire height of the opening.

74. The slider window assembly according to claim 72, further comprising a latch secured to the slider panel and wherein the slider frame includes an integrally-molded latch keeper along the rib that cooperates with the latch to releasably secure the slider panel in the closed position.

75. The slider window assembly according to claim 60, further comprising an upper insert located within and extending along the upper run, wherein the upper run comprises a U-shaped channel having spaced-apart first and second side walls receiving the insert therebetween, and wherein the upper run includes a plurality of upward facing abutments integrally-molded at interior sides of the first and second side walls and engaging the upper insert to secure the upper insert to the upper run.

76. The slider window assembly according to claim 75, wherein the abutments alternate between the first and second side walls along a length of the upper run.

77. The slider window assembly according to claim 60, wherein the slider frame includes a plurality of integrally-molded tabs extending to an edge of the fixed panel.

78. The slider window assembly according to claim 77, wherein an adhesive bead directly contacts the fixed panel and a window frame of the motor vehicle to sealingly secure the fixed frame to the motor vehicle except at the tabs wherein the tabs extend between the bead and the fixed panel.

79. The slider window assembly according to claim 77, wherein the slider frame includes integrally-molded drain paths directing water by gravity from an interior of the lower run to locations outside the motor vehicle and wherein the drain paths are located at the tabs.

80. The slider window assembly according to claim 60, wherein the slider frame is secured to the fixed panel with adhesive and double-sided adhesive tape.

81. The slider window assembly according to claim 80, wherein the adhesive entirely encircles the opening and the double-sided adhesive tape extends along the length of the upper run and the lower run.

* * * * *